Patented Jan. 15, 1935

1,987,996

UNITED STATES PATENT OFFICE 1,987,996

METHOD OF RECOVERING VALUES

Elmer E. Dougherty, Glen Ridge, N. J., assignor to Marlene Ruth Zimmerer, Bloomfield, N. J.

No Drawing. Application June 5, 1934, Serial No. 729,088

7 Claims. (Cl. 75—17)

This invention relates, generally to the reclaiming or recovery of values from used primary cells and the invention has reference, more particularly, to a novel method of recovering metals from the zinc primary battery elements of spent primary batteries.

Heretofore, the spent zinc primary battery elements of used primary batteries such as those of the Edison-Lalande type have generally been treated as waste material since efforts to recover the zinc or other useful metals from such spent zinc primary battery elements have been unsuccessful or commercially impracticable. Such waste material consists of pieces of amalgamated zinc plates, copper wire and washers, iron bolts and nuts, zinc salts and oxide, copper oxide, chips of wood, sand, grease, moisture, paper, rubber etc. A chemical analysis of a typical batch of this waste material has revealed the following ingredients in the percentages given by weight.

| Ingredient | Percent |
|---|---|
| Zinc | 84.68 |
| Copper | 6.00 |
| Mercury | 1.58 |
| Iron oxide | .53 |
| Misc. (wood, sand, glass, etc.) | .77 |
| Undetermined (oil, moisture, water soluble salts, etc.) | 6.44 |

It will be noted from the above analysis that zinc is by far the largest ingredient present, but since this zinc is in the form of an amalgam it is of practically no commercial value.

The principal object of the present invention is to provide a novel and economical process for recovering values and especially the relatively valuable zinc and mercury in substantially pure form from the above described waste material.

Other objects of the invention will appear as the description proceeds.

In carrying out my process, I place a batch of the spent zinc primary battery elements in a graphite or other suitable crucible which may be gas, oil or coal fired. This crucible should be covered with a hood which in turn is connected by piping to a suitable condenser or washer, at the extreme or further end of which is a suction fan for creating a slight suction, thereby preventing any mercury vapors rising from the crucible from escaping into the atmosphere.

Preferably the cleanest pieces of zinc amalgam are placed in the bottom of the crucible and melted at the lowest possible temperature after which additional material which need not be so clean is fed in gradually, the gradual adding of the remaining material serving to obviate the cooling or chilling of the melt. During the melting of the batch, the moisture, grease, organic matter, etc., will be driven off while the zinc-mercury mixture will collect at the bottom of the crucible and the copper oxide, copper wire, washers, iron bolts and nuts, etc., will float to the top as a dross.

This dross may be skimmed off from time to time by means of a perforated iron ladle. If any bolts, nuts or washers should become coated with the molten zinc amalgam and sink to the bottom they are to be removed by dipping the iron ladle to the bottom of the crucible and picking up such solid material with the ladle. This removed dross is set aside to accumulate and when sufficient of the same has collected the zinc, copper and mercury thereof is recovered by suitable methods.

The crucible now contains nothing but a clean concentrated mixture of zinc and mercury, and this mixture or amalgam is now ladled or poured into molds and the ingots or slabs so formed are set aside for the next step or operation. In carrying out this second step of the method, a second graphite or other suitable non-metallic crucible is also used, and the same should be hooded and the hood connected by piping to a condenser or washer for collecting mercury vapors. The same condenser or washer that was used and described in connection with the first step of the method, i. e. the drossing operation may also be used in this second step of the method.

The clean amalgamated zinc is now melted in the second crucible and metallic lead is added in an amount substantially equivalent to two (2) pounds of lead for each one (1) pound of mercury present in the molten batch. The mixture is thoroughly stirred for from three to five minutes as by means of a mechanical stirrer of the removable type. The mixture is then allowed to stand quiescent for a short interval during which time the lead amalgam, which was formed during the stirring of the batch, settles to the bottom of the crucible. The lead, having a greater affinity for mercury than does the zinc, serves to remove the mercury from the mercury-zinc mixture, thereby forming a relatively heavy mercury-lead mixture or amalgam which upon settling to the bottom of the crucible is drawn or tapped off from the bottom thereof and set aside for the later recovery of mercury and the regeneration of the lead.

The zinc remaining in the crucible is examined by well known chemical methods to determine the amount of mercury retained and about the same amount of lead as initially added is added with stirring. The mixture is again allowed to settle and the lead amalgam drawn off at the bottom of the crucible. This second lot of lead amalgam thus withdrawn from the crucible may be used as the first lead addition to the next batch of material handled in the second crucible.

The zinc should now be substantially free of mercury but it may be necessary to add additional lead for the third time with stirring to completely remove all mercury from the zinc. This lead-mercury mixture is then withdrawn at the bottom of the crucible and may be used as the second lead addition to the next batch of material handled. The third addition of lead in this second step of the method should always be pure mercury free lead.

The recovered zinc remaining in the crucible will now be found to be free from all metals with the exception of lead, of which latter metal it will contain about 1%. This recovered zinc is of a grade equivalent to "Prime Western Spelter" which is marketable for many purposes.

The first batch of lead amalgam removed from the crucible during the second step of the method is now placed in a suitable mercury recovery apparatus. This apparatus preferably consists of a retort-like arrangement and may be made of iron but must be tight so as to prevent the escape of mercury fumes into the atmosphere. It is provided with a charging door and an outlet which latter is connected to a suitable condenser. The exit pipe from the condenser preferably connects with the same washer or condenser previously mentioned, the fan of which creates a slight vacuum condition within the retort when the door of the retort is tightly closed. The retort holding the lead amalgam is now heated to distill off the mercury which is collected in the condenser connected to the retort. It sometimes is of advantage, toward the end of the mercury distilling operation, to oxidize the residual lead slightly, and under these circumstances, the retort door is opened as far as necessary, thereby admitting air over the lead mass. The door should be open in any event at the very end of the mercury distilling operation so as to free the retort of mercury fumes before the lead is removed.

The mercury recovered in the condenser is commercially pure and is salable for all purposes. The residual lead and any lead oxide in the retort is reduced to metal by well known means and used over again in the second step of the method.

The dross recovered during the first step of the method and which is rich in zinc and copper and in addition contains some mercury and mechanical impurities is preferably treated in acid proof stoneware vessels with suitable acid, for the ultimate separation of the mechanical impurities and the recovery and utilization of the zinc, mercury and copper.

I claim:

1. That step in the method of recovering values from spent zinc primary battery elements comprising, melting the dross-free zinc amalgam, mixing lead into the molten mass, allowing the lead amalgam so formed to separate out by gravity and then removing the same.

2. That step in the method of recovering values from spent zinc primary battery elements comprising, melting the dross-free zinc amalgam in a crucible, adding lead in a plurality of lots with stirring, allowing the successive batches of lead amalgam thereby formed to settle by gravity to the bottom of the crucible, and successively removing these batches of lead amalgam, thereby obtaining mercury free zinc.

3. The method of recovering values from spent zinc primary battery elements comprising, melting the spent zinc primary battery elements, mechanically removing the dross, thereby obtaining a zinc amalgam, adding lead to this zinc amalgam with stirring, allowing the lead amalgam so formed to settle and removing the same.

4. The method of recovering values from spent zinc primary battery elements comprising, melting the spent zinc primary battery elements, mechanically removing the dross, thereby obtaining a zinc amalgam, adding lead to this zinc amalgam with stirring, allowing the lead amalgam so formed to settle and removing the same, placing this lead amalgam in a retort and distilling off the mercury therefrom.

5. The method of recovering values from spent zinc primary battery elements comprising, melting the spent zinc primary battery elements, mechanically removing the dross, thereby obtaining a zinc amalgam, adding lead in a plurality of consecutive lots with stirring to the molten zinc amalgam, allowing the successive batches of lead amalgam thereby formed to settle by gravity to the bottom of the crucible, and successively removing these batches of lead amalgam, thereby obtaining a commercial grade of zinc.

6. The method of recovering values from spent zinc primary battery elements comprising, melting the spent zinc primary battery elements, mechanically removing the dross, thereby obtaining a zinc amalgam, adding lead in a plurality of consecutive lots with stirring to the molten zinc amalgam, allowing the successive batches of lead amalgam thereby formed to settle by gravity to the bottom of the crucible, and successively removing these batches of lead amalgam, thereby obtaining a commercial grade of zinc, placing the first batch of lead amalgam removed in a retort and distilling off the mercury therefrom, thereby obtaining commercial mercury and lead.

7. The method of recovering values from spent zinc primary battery elements comprising, melting the spent zinc elements, mechanically removing the dross by use of a suitable perforated ladle, thereby obtaining zinc amalgam, adding, with stirring from three to five minutes, substantially twice as much lead by weight as there is mercury present in the zinc amalgam, allowing the lead amalgam so formed to settle and thereafter removing the same, testing the zinc for the presence of mercury, adding additional lead to the molten zinc with stirring, the amount of additional lead added being substantially equal by weight to the amount of lead first added to the zinc, allowing the lead amalgam so formed to settle and removing the same, testing the zinc to see if the same is free of mercury and if not, again adding lead with stirring in amount equal to the amount of lead added in each of the preceding instances and thereafter removing the lead amalgam produced, thereby obtaining a commercial grade of zinc.

ELMER E. DOUGHERTY.